US010867438B2

(12) United States Patent
Ma et al.

(10) Patent No.: US 10,867,438 B2
(45) Date of Patent: Dec. 15, 2020

(54) SYSTEMS AND METHODS FOR UPDATING HIGHLY AUTOMATED DRIVING MAPS

(71) Applicant: BEIJING DIDI INFINITY TECHNOLOGY AND DEVELOPMENT CO., LTD., Beijing (CN)

(72) Inventors: Teng Ma, Beijing (CN); Xiaozhi Qu, Beijing (CN); Baoli Li, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 24 days.

(21) Appl. No.: 16/217,988

(22) Filed: Dec. 12, 2018

(65) Prior Publication Data

US 2019/0392635 A1   Dec. 26, 2019

Related U.S. Application Data

(63) Continuation of application No. PCT/CN2018/092317, filed on Jun. 22, 2018.

(51) Int. Cl.
*G06T 17/05* (2011.01)
*G06T 7/579* (2017.01)
(Continued)

(52) U.S. Cl.
CPC ............ *G06T 17/05* (2013.01); *G01C 21/32* (2013.01); *G01C 21/367* (2013.01); *G06T 7/579* (2017.01); *G06T 2207/10028* (2013.01)

(58) Field of Classification Search
None
See application file for complete search history.

(56) References Cited

U.S. PATENT DOCUMENTS 9,613,455 B1   4/2017   Nelson et al.
9,711,050 B2   7/2017   Ansari
(Continued)

FOREIGN PATENT DOCUMENTS

CA   2976344 A1   8/2016
CN   107229690 A   10/2017
(Continued)

OTHER PUBLICATIONS

The Extended European Search Report in European Application No. 18811702.2 dated Jul. 15, 2019, 8 pages.
(Continued)

*Primary Examiner* — Said Broome
(74) *Attorney, Agent, or Firm* — Bayes PLLC

(57) ABSTRACT

Embodiments of the disclosure provide methods and systems for updating a HAD map using a plurality of terminals. The system may include a communication interface configured to communicate with the plurality of terminals via a network. The system may further include a storage configured to store the HAD map. The system may also include at least one processor. The at least one processor may be configured to identify a target region including at least one changing object. The at least one processor may be further configured to instruct the plurality of terminals to acquire data of the target region at varying view positions, and receive the acquired data from the plurality of terminals. The at least one processor may be further configured to construct a three-dimensional model for the at least one changing object from the acquired data, and update the HAD map based on the three-dimensional model.

18 Claims, 6 Drawing Sheets

(51) Int. Cl.
*G01C 21/36* (2006.01)
*G01C 21/32* (2006.01)

(56) References Cited

U.S. PATENT DOCUMENTS

| | | | |
|---|---|---|---|
| 2010/0148977 | A1 | 6/2010 | Tseng et al. |
| 2014/0309841 | A1* | 10/2014 | Hara ................ G05D 1/024 701/26 |
| 2015/0058300 | A1 | 2/2015 | Perczynski et al. |
| 2015/0289150 | A1* | 10/2015 | Muramoto ............ H04L 1/08 370/252 |
| 2016/0259814 | A1 | 9/2016 | Mizoguchi |
| 2016/0282127 | A1 | 9/2016 | Goto et al. |
| 2017/0305546 | A1 | 10/2017 | Ni et al. |
| 2017/0307398 | A1 | 10/2017 | Iwaasa et al. |
| 2018/0047291 | A1 | 2/2018 | Konishi et al. |
| 2019/0155827 | A1 | 5/2019 | Giurgiu et al. |

FOREIGN PATENT DOCUMENTS

| | | |
|---|---|---|
| CN | 107451526 A | 12/2017 |
| EP | 3244165 A2 | 11/2017 |
| JP | 2001280975 A | 10/2001 |
| JP | 2004020292 A | 1/2004 |
| JP | 2015095000 A | 5/2015 |
| JP | 2017027101 A | 2/2017 |
| WO | 2016130719 A2 | 8/2016 |
| WO | 2017079460 A2 | 5/2017 |
| WO | 2018060313 A1 | 4/2018 |
| WO | 20180191651 A1 | 5/2018 |
| WO | 2018126215 A1 | 7/2018 |
| WO | 2018126228 A1 | 7/2018 |

OTHER PUBLICATIONS

Examination Report in Australian Application No. 2018278993 dated Nov. 8, 2019, 7 pages.
International Search Report in PCT/CN2018/092317 dated Oct. 24, 2018, 5 pages.
Written Opinion in PCT/CN2018/092317 dated Oct. 24, 2018, 4 pages.
The Office Action in Canadian Application No. 3027787 dated Jan. 15, 2020, 5 pages.
Communication Pursuant to Article 94(3) EPC in European Application No. 18811702.2 dated Jul. 7, 2020, 7 Pages.
Notice of Reasons for Rejection in Japanese Application No. 2018-565276 dated Sep. 1, 2020, 6 pages.

* cited by examiner

SYSTEMS AND METHODS FOR UPDATING HIGHLY AUTOMATED DRIVING MAPS

CROSS-REFERENCE TO RELATED APPLICATIONS

This application is a continuation of International Application No. PCT/CN2018/092317, filed on Jun. 22, 2018, designating the United States of America, the contents of which are hereby incorporated by reference.

TECHNICAL FIELD

The present disclosure relates to the systems and methods for updating Highly Automated Driving (HAD) maps, and more particularly to, the systems and methods for crowdsourcing from multiple data acquisition terminals for updating HAD maps.

BACKGROUND

Autonomous driving technology relies heavily on the accurate map. For example, the accuracy of navigation map is critical to functions of autonomous driving vehicles, such as positioning, ambience recognition, decision making and control. In practice, the HAD maps can be generated from the aggregating images and information acquired by various sensors, detectors, and other devices on vehicles as they drive around. For example, a survey vehicle may be equipped with one or more sensors such as a Light Detection and Ranging (LiDAR) radar, a high-resolution camera, a Global Positioning System (GPS), or an Inertial Measurement Unit (IMU), to capture the features of road or surrounding objects. Data captured may include, e.g., center line or border line coordinates of a lane, coordinates and pattern of an object, such as a building, another vehicle, a landmark, a pedestrian, or a traffic sign.

Due to re-planning, new developments, constructions, and other infrastructure changes, HAD maps need to be updated routinely to accurately reflect the road information. For example, a single-lane road may be expanded to a two-lane road, and accordingly, the road marks, traffic signs, traffic lights, and the surrounding objects, such as trees and buildings, may change or move. The HAD update maps typically requires re-surveying the portion of the road that has been changed by a survey vehicle. However, dispatching the million-dollar worth survey vehicle to acquire data for minor changes of maps leads to maintain a large number of survey vehicles, that may amount to a significant cost and thus not economically viable. It may also require considerable human interventions, which translate to an even higher cost. On the other hand, updating the map with low-resolution data acquired by low-cost equipment impairs the quality of the map. Therefore, an improved system and method for updating a high-resolution map is needed.

Embodiments of the disclosure address the above problems by methods and systems for updating a high-resolution map based on crowdsourcing from multiple data acquisition terminals.

SUMMARY

Embodiments of the disclosure provide a system for updating a HAD map using a plurality of terminals. The system may include a communication interface configured to communicate with the plurality of terminals via a network. The system may further include a storage configured to store the HAD map. The system may also include at least one processor. The at least one processor may be configured to identify a target region including at least one changing object. The at least one processor may be further configured to instruct the plurality of terminals to acquire data of the target region at varying view positions, and receive the acquired data from the plurality of terminals. The at least one processor may also be configured to construct a three-dimensional model for the at least one changing object from the acquired data, and update the HAD map based on the three-dimensional model.

Embodiments of the disclosure further disclose a method for updating a HAD map using a plurality of terminals. The method may include identifying, by at least one processor, a target region including at least one changing object. The method may further include instructing, by the at least one processor, the plurality of terminals to acquire data of the target region at varying view positions, and receiving the acquired data from the plurality of terminals. The method may also include constructing, by the at least one processor, a three-dimensional model for the at least one changing object from the acquired data, and updating, by the at least one processor, the HAD map based on the three-dimensional model.

Embodiments of the disclosure further disclose a non-transitory computer-readable medium having a computer program stored thereon. The computer program, when executed by at least one processor, may perform a method for updating a HAD map using a plurality of terminals. The method may include identifying a target region including at least one changing object. The method may further include instructing the plurality of terminals to acquire data of the target region at varying view positions, and receiving the acquired data from the plurality of terminals. The method may also include constructing a three-dimensional model for the at least one changing object from the acquired data, and updating the HAD map based on the three-dimensional model.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
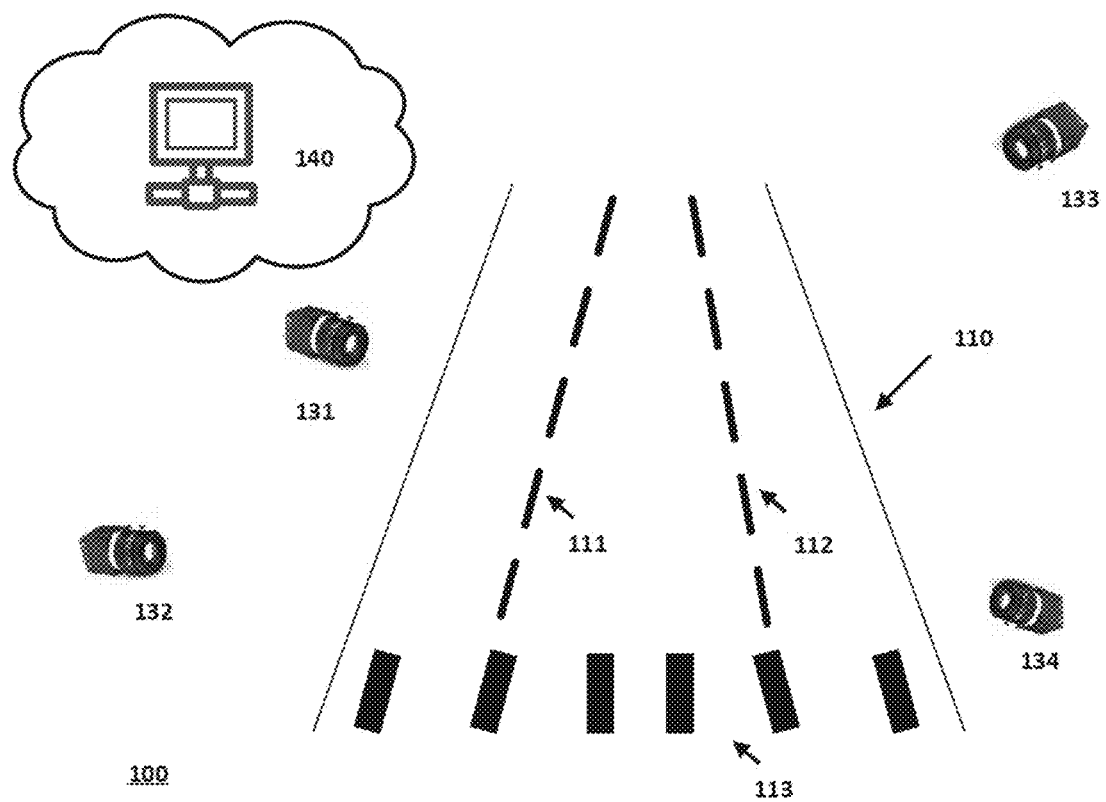
FIG. 1 illustrates a schematic diagram of an exemplary system for updating a HAD map, according to embodiments of the disclosure.

FIG. 1 illustrates a schematic diagram of an exemplary system 100 for updating a HAD map, according to embodiments of the disclosure. Consistent with some embodiments, system 100 may include a server 140 communicatively connected with a plurality of terminals, including terminals 131, 132, 133, and 134. In some embodiments, server 140 may be a local physical server, a cloud server (as illustrated in FIG. 1), a virtual server, a distributed server, or any other suitable computing device. Consistent with the present disclosure, server 140 may store a HAD map. In some embodiments, the HAD map may be originally constructed using point cloud data acquired by a LiDAR. LiDAR measures distance to a target by illuminating the target with pulsed laser light and measuring the reflected pulses with a sensor. Differences of the time for laser light sending and returning, and wavelengths can then be used to make digital three-dimensional (3-D) representations of the target. The light used for LiDAR scan may be ultraviolet, visible, or near infrared. Due to the high accuracy and efficiency of objects reconstruction, LiDAR is particularly suitable for spatial data acquisition for constructing HAD.

Consistent with the present disclosure, server 140 may be also responsible for updating the HAD map from time to time to reflect changes at certain portions of the map. Instead of re-surveying the area with a LiDAR, server 140 may crowdsource data captured of the changing objects by multiple terminals at varying view positions, and integrate such data to update the HAD map. For example, server 140 may crowdsource data from terminals 131-134. Server 140 may communicate with terminals 131-134 via a network, such as a Wireless Local Area Network (WLAN), a Wide Area Network (WAN), wireless networks such as radio waves, a nationwide cellular network, a satellite communication network, and/or a local wireless network (e.g., Bluetooth™ or WiFi). Server 140 may transmit to or receive data from terminals 131-134. It is contemplated that server 140 may crowdsource from more or less terminals than those illustrated in FIG. 1.

In some embodiments, terminals 131-134 may be mobile terminals configured to capture images. For example, terminals 131-134 may be cameras or other cost-effective imaging devices. In some embodiments, terminals 131-134 may be equipped, mounted, or otherwise attached to a vehicle, such that the terminals may be carried around by the vehicle. The vehicle may be configured to be operated by an operator occupying the vehicle, remotely controlled, and/or autonomous. In some embodiments, some of terminals 131-134 may be static, such as surveillance cameras installed on a traffic light, a building, a tree, etc.

When terminals 131-134 are mobile terminals, they may be positioned using a combination of the position information obtained from different sources. For example, a terminal may use the GPS signal and IMU signal provided by the vehicle carrying the terminal, images captured by the terminal, as well as a HAD map provided by server 140, to position itself. In some embodiments, a Simultaneous Localization and Mapping (SLAM) method may be performed to position each terminal. GPS/IMU signals and the HAD map may provide additional information to the SLAM algorithm, thus enhancing its positioning accuracy and reliability.

Terminals 131-134 may acquire images of a road 110 from different view positions. Based on the acquired images, terminals 131-134 may detect changes in at least one object within the scene. For example, road 110 used to be a two-lane road with a lane marking 111 dividing the two lanes. Recently, road 110 went under construction and expanded to a three-lane road with lane markings 111 and 112 dividing road 110. From the acquired images, terminals 131-134 may detect the changes in road 110, e.g., the addition of lane marking 112 and modified pedestrian crossing line marking 113 (i.e., the zebra line). The detected changes, along with the captured images may be provided to server 140.

Upon learning that changes have occurred, server 140 may initiate a map updating process. In some embodiments, server 140 may identify a target region that includes the changing objects. For example, if terminal 131 reports the change, server 140 may determine the target region based on the position of terminal 131 and the changing objects, e.g., markings 112 and 113 as detected by terminal 131. Server 140 may then send data acquisition instructions to terminals 131-134 that are located near the changing objects. In some embodiments, the instructions may specify the target region and instruct terminals 131-134 to acquire images of the target region. For example, the target region may be the portion of road 110 illustrated in FIG. 1.

Because terminals 131-134 are positioned at different angles and/or distances relative to the target area, they may acquire images of a same scene from different view positions. Accordingly, the varying view positions enable terminals 131-134 to obtain unique information about road 110. Such information, when integrated, can help server 140 reconstruct a 3-D model of road 110. Server 140 may further match the reconstructed 3-D model with the HAD map and update the corresponding portion of the map.

Although FIG. 1 illustrates an area of road 110 as containing exemplary changing objects such as markings 112 and 113, it is contemplated that the disclosed systems and methods may apply to update the HAD map to reflect other changing objects. For example, changing objects may include new or modified traffic signs, construction or demolition of a building on the side of road 110, changing landscaping along road 110, etc.

Figure 2:
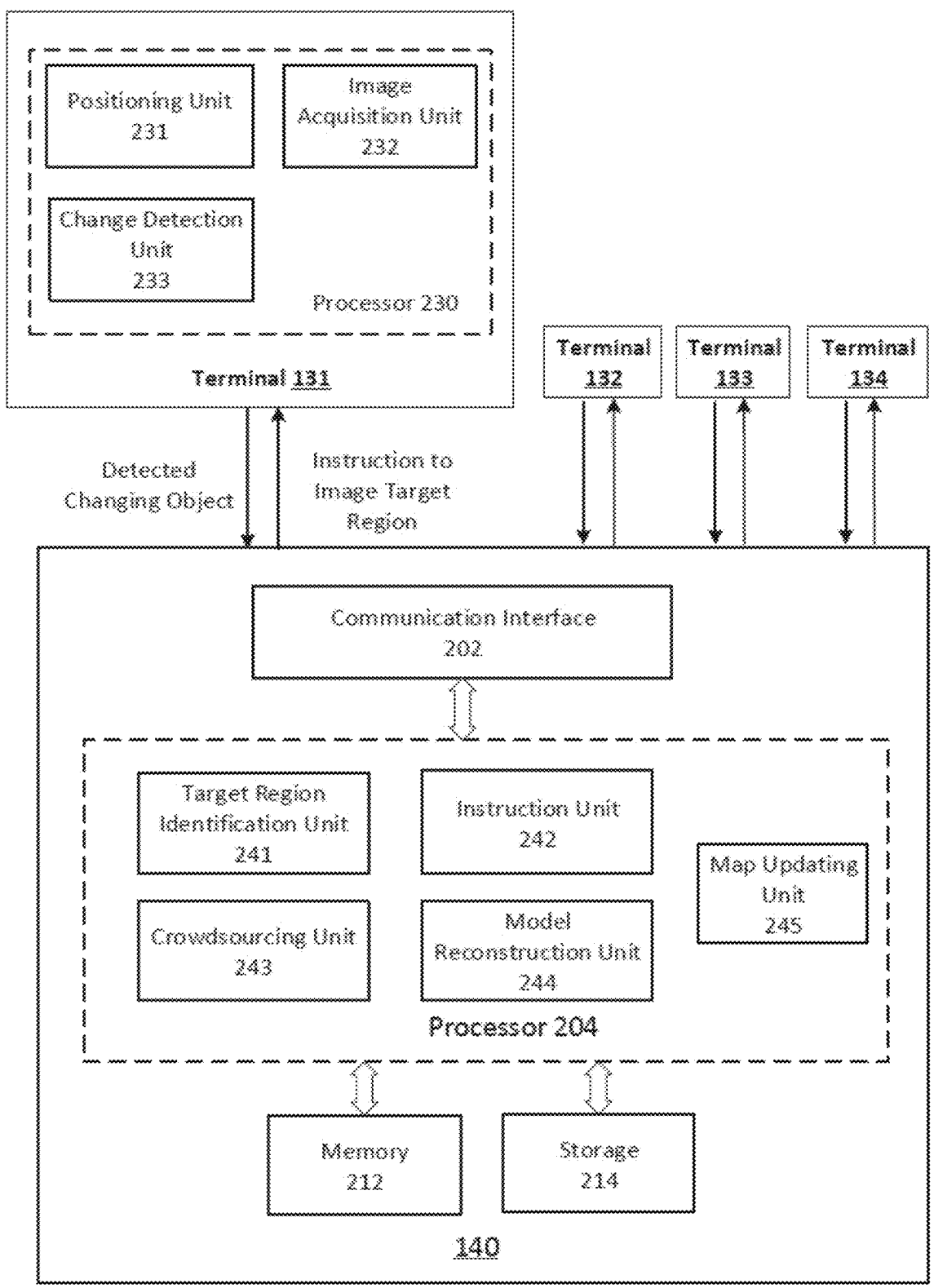
FIG. 2 illustrates a block diagram of an exemplary system for updating a HAD map, according to embodiments of the disclosure.

FIG. 2 illustrates a block diagram of an exemplary system for updating a HAD map, according to embodiments of the disclosure. Consistent with the present disclosure, server 140 may collect data through terminal 131-134 and integrate the data from multiple sources to update a HAD map.

In some embodiments, as shown in FIG. 2, server 140 may include a communication interface 202, a processor 204, a memory 212, and a storage 214. In some embodiments, server 140 may have different modules in a single device, such as a standalone computing device, or separated devices with dedicated functions. In some embodiments, one or more components of server 140 may be located in a cloud, or may be alternatively in a single location or distributed locations. Components of server 140 may be in an integrated device, or distributed at different locations but communicate with each other through a network (not shown).

Although omitted by FIG. 2, it is contemplated that each of terminals 131-134 may also include hardware components similar to those shown in server 140, such as a processor 230, a communication interface (not shown), a memory (not shown) and a storage (not shown).

Communication interface 202 may send data to and receive data from terminals 131-134 or other system or device the terminals are attached to (e.g., a vehicle) via communication cables, a Wireless Local Area Network (WLAN), a Wide Area Network (WAN), wireless networks such as radio waves, a nationwide cellular network, and/or a local wireless network (e.g., Bluetooth™ or WiFi), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments of the present disclosure, communication interface 202 may receive images captured by terminals 131-134, and provide the received data to storage 214 for storage or to processor 204 for processing. Communication interface 202 may also receive information or signals generated by processor 204, and provide them to terminals 131-134 to coordinate their image acquisitions.

Processor 204 and processor 230 may include any appropriate type of general-purpose or special-purpose microprocessor, digital signal processor, or microcontroller. In some embodiments, processor 204 may be configured as a separate processor module dedicated to updating a HAD map. Processor 230 may be configured as a separate processor module dedicated to acquiring images for updating the HAD map. Alternatively, processor 204 and processor 230 may be configured as a shared processor module for performing other functions unrelated to map updates.

As shown in FIG. 2, processor 230 may include multiple modules, such as a positioning unit 231, an image acquisition unit 232, a change detection unit 233, and the like. These modules (and any corresponding sub-modules or sub-units) can be hardware units (e.g., portions of an integrated circuit) of processor 230 designed for use with other components or to execute a part of a program. The program may be stored on a computer-readable medium, and when executed by processor 230, it may perform one or more functions. Although FIG. 2 shows units 231-233 all within one processor 230, it is contemplated that these units may be distributed among multiple processors located near or remotely with each other.

Positioning unit 231 may be configured to position terminal 131. In some embodiments, positioning unit 231 may perform a SLAM method to determine the position. However, SLAM method applied to monocular images alone typically cannot provide accurate positioning information, and positioning errors may accumulate. Consistent with the present disclosure, positioning unit 231 may integrate GPS and IMU data into the SLAM method as guidance. In some embodiments, positioning unit 231 may further integrate information provided by the existing HAD map, especially when GPS signal is lost or disturbed by blocking objects such as tall buildings. Both GPS/IMU data and the HAD map may provide absolute positioning information that may be used as constraints or a priori information to improve the SLAM method. Therefore, the improved SLAM method positions terminal 131 more accurately and reliably.

Image acquisition unit 232 may be configured to capture images of surrounding objects. In some embodiments, image acquisition unit 232 may include a controller controlling the setting and operation of a monocular camera. For example, image acquisition unit 232 may control and adjust the focus, aperture, shutter speed, white balance, metering, filters, and other settings of the camera. In some embodiments, image acquisition unit 232 may control and adjust the orientation and position of the camera so that the camera captures an image at a predetermined view angle and position. In some embodiments, the camera may be set to capture images upon triggers, continuously, or periodically, and each image captured at a time point is called a frame.

Change detection unit 233 may be configured to detect at least one changing object based on the captured images. Image segmentation and machine learning techniques may be applied for detecting the changing object. In some embodiments, change detection unit 233 may compare the image with the corresponding information in the existing HAD map to determine the change. For example, change detection unit 233 may detect that markings 112 and 113 on road 110 have been changed.

Upon detecting a changing object, terminal 131 may provide the captured images, the detected changing object, and its positioning information to server 140. Communication interface 202 may receive the data and send the data to processor 204. As shown in FIG. 2, processor 204 may include multiple modules, such as a target region identification unit 241, an instruction unit 242, a crowdsourcing unit 243, a model reconstruction unit 244, a map updating unit 245, and the like. These modules (and any corresponding sub-modules or sub-units) can be hardware units (e.g., portions of an integrated circuit) of processor 204 designed for use with other components or to execute a part of a program. The program may be stored on a computer-readable medium, and when executed by processor 204, it may perform one or more functions. Again, although FIG. 2 shows units 241-245 all within one processor 204, it is contemplated that these units may be distributed among multiple processors located near or remotely with each other.

Target region identification unit 241 may identify a target region based on the data provided by terminal 131. The target region may include the detected changing object(s). For example, in the example illustrated by FIG. 1, the target region may be the portion of road 110 that includes the changed markings 112 and 113. Instruction unit 242 may then determine an instruction for acquiring image of the target region. Instruction unit 242 may further identify multiple terminals, such as terminals 131-134, to send the image acquisition instruction. In identifying the terminals, instruction unit 242 may consider the terminal's location (e.g., whether within imaging range to the target region), the terminal's view position relative to the target region, etc. In some embodiments, instruction unit 242 may select terminals that can capture images of the target region from varying view positions.

The image acquisition instructions may be sent to terminals 131-134 via communication interface 202. The respective image acquisition units of terminals 131-134 may acquire images of the target region according to the instructions, and send images back to server 140. The images may be collected and organized by crowdsourcing unit 243 before passing along to model reconstruction unit 244.

Model reconstruction unit 244 may be configured to reconstruct a 3-D model of the at least one changing object. In some embodiments, model reconstruction unit 244 may adopt the detection results of the at least one changing object as provided by terminal 131. In some other embodiments, model reconstruction unit 244 may verify the results or re-detect the at least one object itself based on the images provided by terminal 131. Similar techniques may perform the similar image segmentation and machine learning techniques to detect and extract the at least one changing object.

Since images are captured by terminals 131-134 from varying view positions, model reconstruction unit 244 may extract different views of the object from those images. The extracted objects are two dimensional (2-D). To construct a 3-D model, model reconstruction unit 244 may combine the different views of the object according to the positions and poses of the respective images from which the different views of the changing object are extracted. In some embodiments, model reconstruction unit 244 may use a Structure from Motion (SfM) method to reconstruct the position and pose of each image. In some embodiments, model reconstruction unit 244 may determine that the images available are not sufficient for a good reconstruction. For example, images captured at certain view positions are missing. It may instruct terminals 131-134 and/or additional terminals (not shown) to acquire more images to supplement.

Map updating unit 245 may match the 3-D model of the changing object with the existing HAD map, and replace the part in the map corresponding to the object with the 3-D model as matched to the map. In some embodiments, the 3-D model reconstructed by model reconstruction unit 244 may be a point cloud representing the at least one changing object. Accordingly, map updating unit 245 may match the point cloud of the changing object with the point cloud of the HAD map. In some embodiments, as part of the matching process, map updating unit 245 may perform a coordinate transformation on data of the reconstructed 3-D model to the coordinate of the HAD map.

It is contemplated that server 140 may perform map updates when any change occurs, when a major change occurs, periodically at a predetermined frequency, or any suitable combination of the above.

Memory 212 and storage 214 may include any appropriate type of mass storage provided to store any type of information that processor 204 may need to operate. Memory 212 and storage 214 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 212 and/or storage 214 may be configured to store one or more computer programs that may be executed by processor 204 to perform map update functions disclosed in this application. For example, memory 212 and/or storage 214 may be configured to store program(s) that may be executed by processor 204 to communicate with terminals 131-134 for image acquisitions, and update a HAD map using the images.

Memory 212 and/or storage 214 may be further configured to store information and data used by processor 204. For instance, memory 212 and/or storage 214 may be configured to store the HAD map, including its point cloud data, and images captured by terminals 131-134, the machine learning models (e.g., the model parameters) and the feature maps, and other intermediate data created during the processing. These data may be stored permanently, removed periodically, or disregarded immediately after each frame of data is processed.

Figure 3:
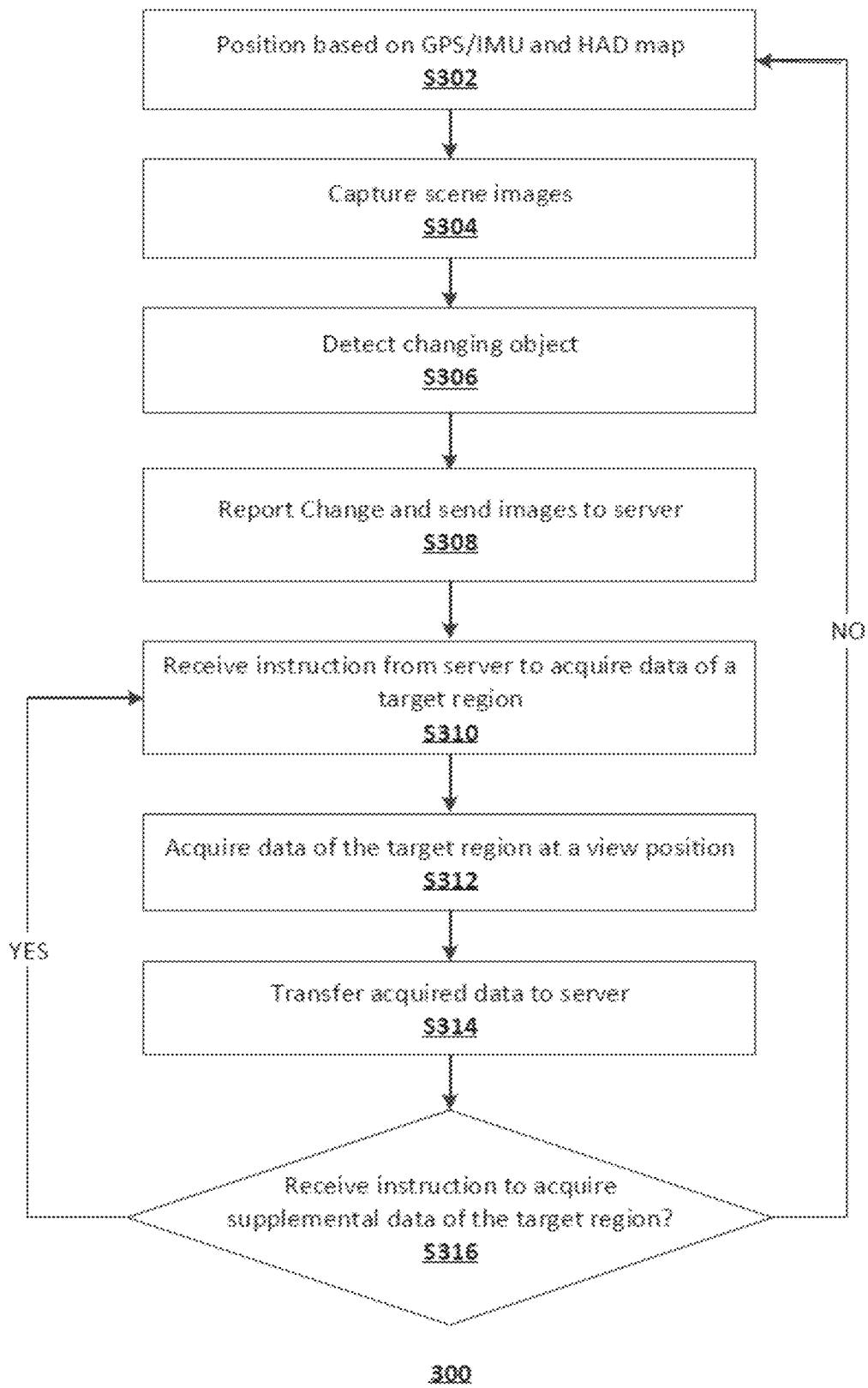
FIG. 3 is a flowchart of an exemplary method performed by a terminal for acquiring data to update a HAD map, according to embodiments of the disclosure.

FIG. 3 is a flowchart of an exemplary method 300 performed by a terminal for acquiring data to update a HAD map, according to embodiments of the disclosure. For example, method 300 may be implemented by processor 230 of terminal 131. Method 300 may include steps S302-S314 as described below.

In step S302, terminal 131 may be configured to position itself. For example, positioning unit 231 may be configured to perform a SLAM method to determine the position of terminal 131. SLAM algorithm attempts to constructs a map of an unknown environment while simultaneously keeping track of a vehicle or device's location within it. Therefore, SLAM algorithm may accumulate positioning errors when performed without absolute position information as guidance. Consistent with the present disclosure, positioning 231 may use GPS/IMU data and/or the HAD map to guide and improve the SLAM method. GPS/IMU data and the HAD map may provide absolute positioning information as constraints or a priori information to the SLAM method. The use of HAD map may help ensure positioning accuracy and reliability even when GPS signal is weak or entirely lost.

In step S304, terminal 131 may be configured to capture scene images. For example, image acquisition unit 232 may control a monocular camera to capture images of a scene. In some embodiments, image acquisition unit 232 may control the way in which the images are captured. For example, image acquisition unit 232 may control and adjust the orientation and position of the camera so that the camera captures an image at a predetermined view angle and position. In some embodiments, images may be captured upon triggers, continuously or periodically.

In step S306, terminal 131 may detect at least one changing object based on the captured images. For example, change detection unit 233 may be configured to detect the at least one changing object using image segmentation and machine learning techniques. The at least one changing object may include a traffic sign such as a stop or yield sign, and a highway sign, etc. The at least one changing object may also include road markings such as lane markings, direction/turn markings, and pedestrian crossing line markings. In some embodiments, an image may be compared with the corresponding information in the existing HAD map to determine the change.

Figure 4:
FIG. 4 illustrates detecting a changing object from an image, according to embodiments of the disclosure.

For example, FIG. 4 illustrates detecting a changing object from an image 400, according to embodiments of the disclosure. Change detection unit 233 may first identify various objects captured by image 400, such as traffic signs 411-413, a vehicle 420, and a road marking 430. The objects may be extracted with binding boxes. Change detection unit 233 may identify moving objects, such as vehicle 420, and remove such objects since they should not be included as a part of the map. In some embodiments, the object areas may be compared with the corresponding areas on the HAD map to determine if any object has changed. For example, change detection unit 233 may determine that traffic sign 411 is new, or that the texts on traffic sign 412 have changed. In some embodiments, machine learning methods may be used to recognize the texts and semantic meaning of the texts on the traffic signs.

Returning to FIG. 3, in step S308, upon detecting a changing object, terminal 131 may report the changing object to server 140. In addition, terminal 131 may also send the captured images from which the change was detected to server 140 for server 140 to verify or re-detect. Because server 140 may have much higher computing power than terminal 131, server 140 may use more accurate but complicated methods to detect the changing objects. Terminal 131 may also send its positioning information to server 140.

In step S310, terminal 131 may receive an instruction from server 140 to acquire image data of a target region. In some embodiments, the instruction may further include the view position at which server 140 would like terminal 131 to capture the images. In step S312, terminal 131 may capture the images of the target region at the view position, as instructed. For example, image acquisition unit 232 may adjust the monocular camera to the view position. In step S314, the captured image data may be transferred back to server 140.

In S316, terminal 131 may receive another instruction from server 140 to acquire supplemental data of the target region. In some embodiments, the supplemental data may be acquired from the same view position as before, or from a different view position. If an instruction for supplemental data is received in S316, method 300 may return to step S310 to acquire the supplemental data. Otherwise, method 300 may return to step S302 to continue capturing images and detecting changes.

Figure 5:
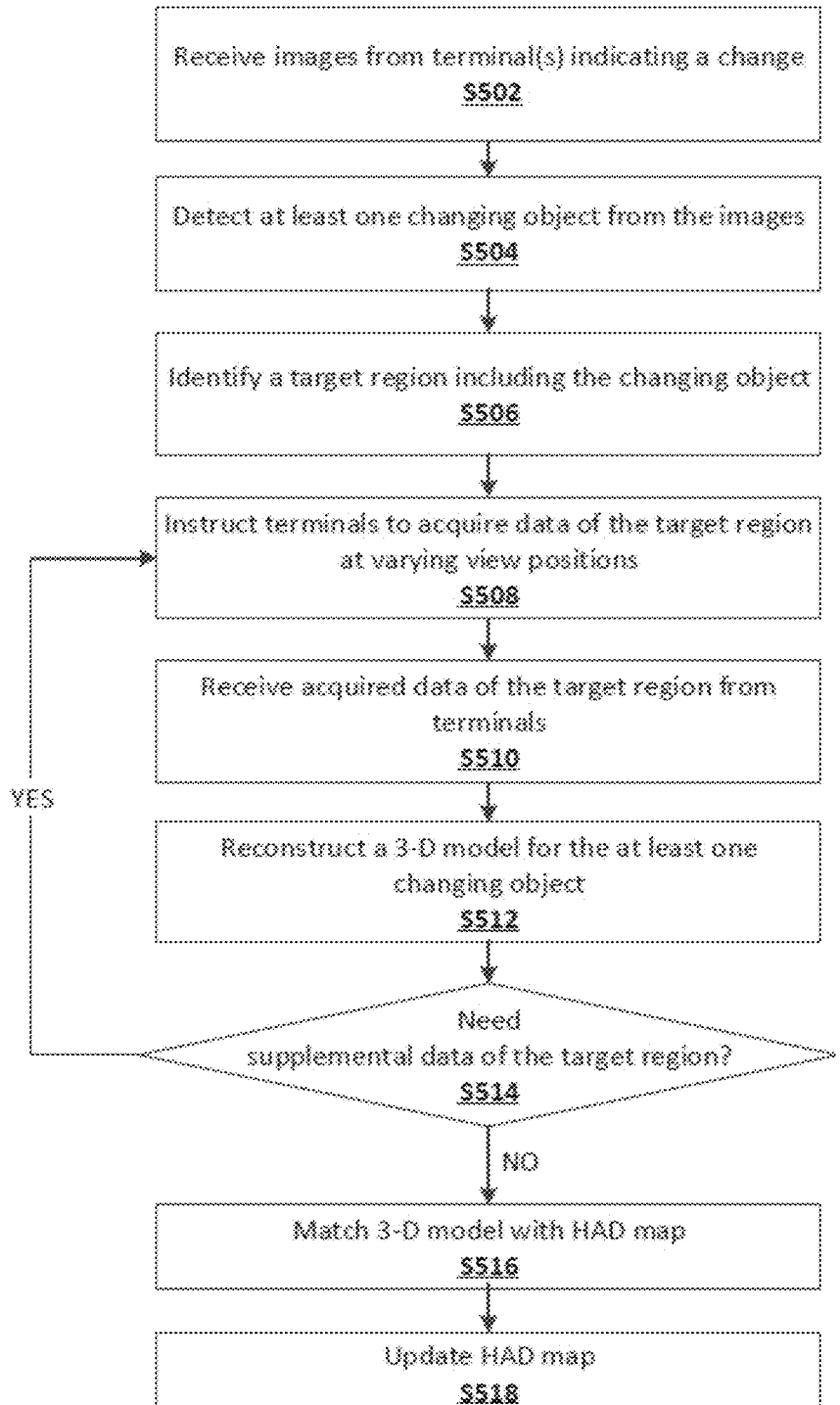
FIG. 5 is a flowchart of an exemplary method for updating a HAD map, according to embodiments of the disclosure.

FIG. 5 is a flowchart of an exemplary method 500 for updating a HAD map, according to embodiments of the disclosure. For example, method 500 may be implemented by processor 204 of server 140. Method 500 may include steps S502-S518 as described below.

In step S502, server 140 may receive a report from one or more terminals such that at least one changing object has been detected. In some embodiments, server 140 may also receive the images captured by the terminal(s). In the optional step S504, server 140 may verify or re-detect the at least one changing object based on the images. Because server 140 may have higher computing power than the terminals, its detection may be more accurate. For example, server 140 may receive images from multiple terminals that all capture the same object, and thus have more data to detect the changing object.

In step S506, server 140 may identify a target region based on the data provided by the terminal(s). For example, target region identification unit 241 may determine a target region that includes the detected changing object(s).

In step S508, sever 140 may instruct terminals to acquire image data of the target region at varying view positions. For example, instruction unit 242 may identify multiple terminals, such as terminals 131-134, that should be instructed to acquire the images. The identification may be based on the terminal's location (e.g., whether within imaging range to the target region), the terminal's view position relative to the target region, etc. In some embodiments, instruction unit 242 may select terminals that can capture images of the target region from varying view positions.

In step S510, as terminals 131-134 send acquired images back to server 140, crowdsourcing unit 243 may receive the images and organize them in a certain order before passing along for model reconstruction. For example, crowdsourcing unit 243 may organize the images according to view positions, resolutions, and coverages of the changing object (s), etc.

In step S512, server 140 may reconstruct a 3-D model of the at least one changing object. In some embodiments, the 3-D model reconstructed in step S512 may be a point cloud representing the at least one changing object. In some embodiments, model reconstruction unit 244 may extract different views of the object from the images captured from varying view positions. To construct a 3-D model, model reconstruction unit may combine the extracted 2-D object images according to the positions and poses of the respective images from which the 2-D object images are extracted.

Figure 6:
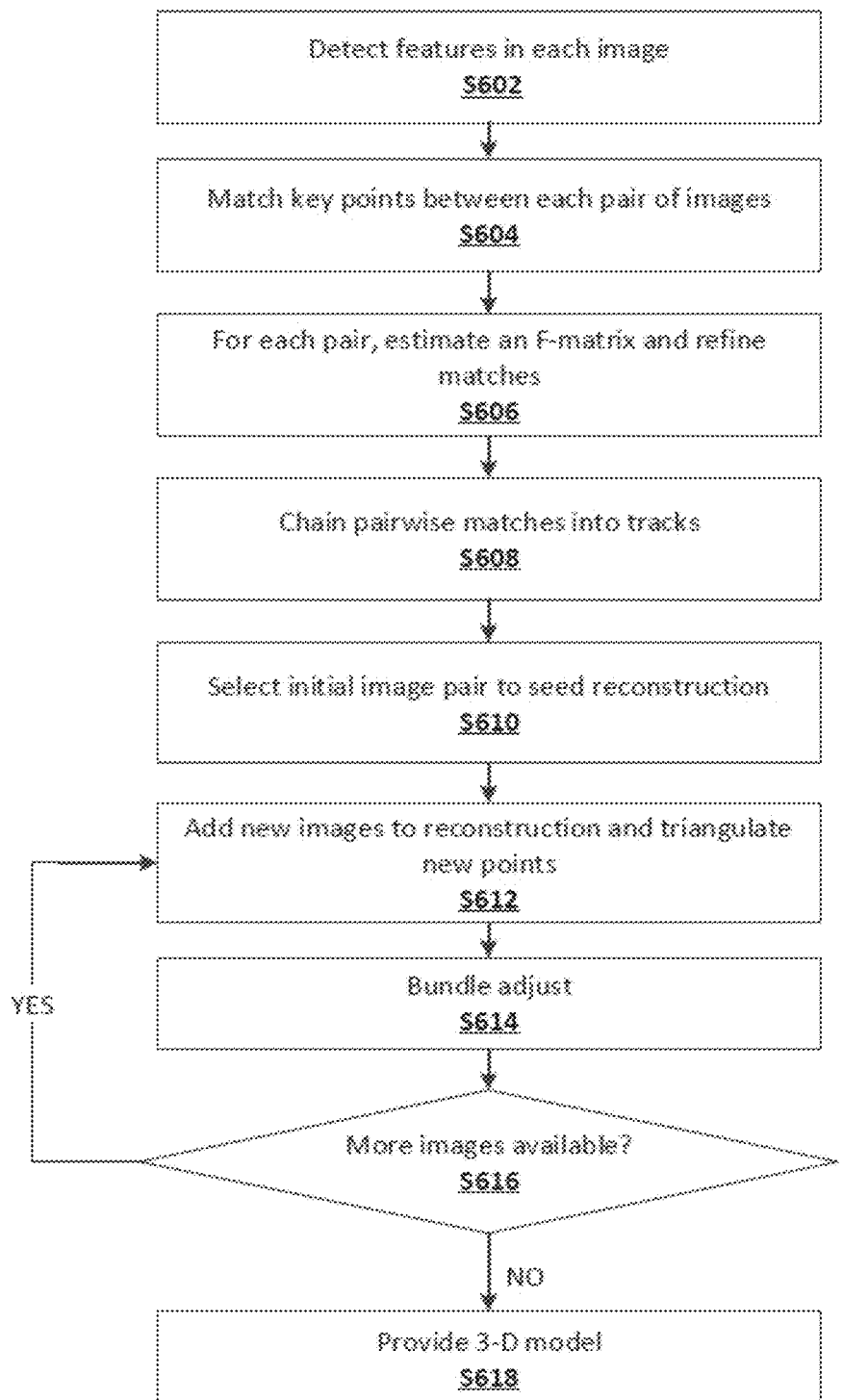
FIG. 6 is a flowchart of an exemplary method for reconstructing a three-dimensional model of a changing object, according to embodiments of the disclosure.

In some embodiments, model reconstruction unit 244 may use a SfM method to reconstruct the position and pose of each image. For example, FIG. 6 is a flowchart of an exemplary method 512 for 3D reconstruction of a changing object using a SfM method, according to embodiments of the disclosure. For example, method 512 may be implemented by processor 204 of server 140. Method 512 may include steps S602-S618 as described below.

Steps S602-S608 are performed to compute the correspondences among the captured images. In step S602, server 140 may detect features in each image captured by the terminals. In some embodiments, image features detected may be semantic, such as pixel intensity, contrast, gradient, patches, or non-semantic, which is a piece of information related to the image. In step S604, key points may be matched between each pair of images. In some embodiments, key points matching may be performed by machine learning methods based on the features detected in step S602. In step S606, an F-matrix may be estimated for each pair of images to refine the matches of step S604. In step S608, the matched points in each pair is organized and stacked into tracks.

Steps S610-S616 are part of the SfM method to reconstruct the 3-D model. In step S610, server 140 may select a pair of initial images to seed the reconstruction. In some embodiments, the pair of initial images may have best coverage of the changing object. Server 140 may consider various factors in selecting the pair of initial images, such as image quality, resolution, view positions at which the images are captured, overall level of correspondence between the images, etc. In step S612, additional images may be added to refine the reconstruction. For example, pairs of images as determined in S602-S608 may be added. Additional images provide additional information from varying view points and thus may improve the 3-D model reconstruction. In step S614, bundle adjustment may be performed to make the entire 3-D model more realistic. In S616, server 140 may determine if more images are available from the tracks to be added to the reconstruction. If so, method 512 may return to step S612 to continue reconstructing. Otherwise, method 512 may provide the reconstructed 3-D model in Step S618.

Returning to FIG. 5, in step S514, server 140 may determine, based on the 3-D model, construction result whether supplemental data of the target region is needed. If so, model reconstruction unit 244 may determine view positions at which supplemental images should be captured by the terminals. For example, if received images are captured from 0-180 degrees view angles but nothing is from 180-360 degrees view angles, model reconstruction unit 244 may request supplemental data captured at 180-360 degrees view angles. If supplemental data is needed, Method 500 may return to step S508 where instruction unit 242 may instruct the terminals to acquire more images at the desired view positions.

In step S516, server 140 may match the 3-D model of the changing object with the existing HAD map. In some embodiments, map updating unit 245 may match the point cloud of the changing object with the point cloud of the HAD map. In some embodiments, map updating unit 245 may transform data of the reconstructed 3-D model from its original coordinate to the coordinate of the HAD map. A coordinate transformation essentially maps data from one coordinate system to another coordinate system by rotation and translation transformations.

In some embodiments, step S516 may contain two sub-steps. First, the point cloud of the reconstructed 3-D model may be mapped to the coordinate system of the HAD map, based on the positioning information provided by the terminals. Second, map updating unit 245 may construct a cost function using the corresponding points from the point cloud of the 3-D model and the point cloud of the HAD map. For example, an exemplary cost function $f$ may be constructed as Eq. 1:

$$f(R, T) = \frac{1}{N_p} \sum_{i=1}^{N_p} |p_t^i - R \cdot p_s^i - T|^2 \qquad \text{Eq. 1}$$

where $p_s$ and $p_t$ are a pair of corresponding points from the point cloud of the 3-D model and the point cloud of the HAD map, and $N_p$ is the total number of pairs of points. R and T are rotation matrix and translation matrix, respectively. In some embodiments, optimal R and T matrices may be obtained by minimizing the cost function $f$. For example, the optimization may be solved using an Iterative Closest Points (ICP) method or its variations.

In step S518, server 140 may update the HAD map. In some embodiments, map updating unit 245 may replace the part in the map that is corresponding to the object with the 3-D model transformed into the map coordinate system. For example, map updating unit 245 may use the optimized R and T matrices for the coordinate transformation. Alternatively, map updating unit 245 may modify the corresponding map based on the 3-D model.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for updating a HAD map using a plurality of terminals, comprising:
   a communication interface configured to communicate with the plurality of terminals via a network, the plurality of terminals being positioned based on the HAD map;
   a storage configured to store the HAD map; and
   at least one processor, configured to:
   identify a target region including at least one changing object;
   instruct the plurality of terminals to acquire data of the target region at varying view positions;
   receive the acquired data from the plurality of terminals;
   construct a three-dimensional model for the at least one changing object from the acquired data; and
   update the HAD map based on the three-dimensional model.

2. The system of claim 1, wherein the plurality of terminals include at least one camera configured to acquire image data.

3. The system of claim 1, wherein the plurality of terminals are configured to:
   acquire image data indicative of objects associated with the HAD map;
   detect the at least one changing object based on the image data; and
   report the at least one changing object to the at least one processor.

4. The system of claim 1, wherein the at least one processor is further configured to reconstruct the at least one changing object using a Structure from Motion algorithm.

5. The system of claim 4, wherein a predetermined shape is used as a constraint for the Structure from Motion algorithm.

6. The system of claim 1, wherein the three-dimensional model is a point cloud model.

7. The system of claim 1, wherein the at least one processor is further configured to cause to adjust the plurality of terminals to acquire supplemental data based on the three-dimensional model.

8. The system of claim 1, wherein to update the HAD map, the at least one processor is further configured to match a first point cloud associated with the at least one changing object with a second point cloud associated with the HAD map.

9. The system of claim 1, wherein to update the HAD map, the at least one processor is further configured to transform the three-dimensional model into a coordinate of the HAD map.

10. A method for updating a HAD map using a plurality of terminals, comprising:
    identifying, by at least one processor, a target region including at least one changing object;
    instructing, by the at least one processor, the plurality of terminals to acquire data of the target region at varying view positions, the plurality of terminals being positioned based on the HAD map;
    receiving the acquired data from the plurality of terminals;
    constructing, by the at least one processor, a three-dimensional model for the at least one changing object from the acquired data; and
    updating, by the at least one processor, the HAD map based on the three-dimensional model.

11. The method of claim 10, further including:
    acquiring, by the plurality of terminals, image data indicative of objects associated with the HAD map; and
    detecting, by the plurality of terminals, the at least one changing object based on the image data.

12. The method of claim 10, further including reconstructing the at least one changing object using a Structure from Motion algorithm.

13. The method of claim 12, wherein a predetermined shape is used as a constraint for the Structure from Motion algorithm.

14. The method of claim 10, wherein the three-dimensional model is a point cloud model.

15. The method of claim 10, further including causing to adjust the plurality of terminals to acquire supplemental data based on the three-dimensional model.

16. The method of claim 10, wherein updating the HAD map further includes matching a first point cloud associated with the target region with a second point cloud associated with the HAD map.

17. The method of claim 10, wherein updating the HAD map further includes transforming the three-dimensional model into a coordinate of the HAD map.

18. A non-transitory computer-readable medium having a computer program stored thereon, wherein the computer program, when executed by at least one processor, performs a method for updating a HAD map using a plurality of terminals, the method comprising:

identifying a target region including at least one changing object;

instructing the plurality of terminals to acquire data of the target region at varying view positions, the plurality of terminals being positioned based on the HAD map;

receiving the acquired data from the plurality of terminals;

constructing a three-dimensional model for the at least one changing object from the acquired data; and updating the HAD map based on the three-dimensional model.

\* \* \* \* \*